(12) United States Patent
Nishihata et al.

(10) Patent No.: US 6,762,229 B2
(45) Date of Patent: Jul. 13, 2004

(54) POLYARYLENE SULFIDE RESIN COMPOSITION

(75) Inventors: Naomitsu Nishihata, Fukushima (JP); Masahito Tada, Fukushima (JP); Hiroyuki Sato, Fukushima (JP); Kiyomi Ohuchi, Fukushima (JP)

(73) Assignee: Kureha Kagaku Kogyo K.K., Tokyo (JP)

( * ) Notice: Subject to any disclaimer, the term of this patent is extended or adjusted under 35 U.S.C. 154(b) by 3 days.

(21) Appl. No.: 09/308,491

(22) PCT Filed: Nov. 20, 1997

(86) PCT No.: PCT/JP97/04219

§ 371 (c)(1),
(2), (4) Date: May 20, 1999

(87) PCT Pub. No.: WO98/22534

PCT Pub. Date: May 28, 1998

(65) Prior Publication Data

US 2003/0153660 A1 Aug. 14, 2003

(30) Foreign Application Priority Data

Nov. 20, 1996 (JP) .............................................. 8-324717

(51) Int. Cl.$^7$ .............................. C08J 3/00; C08K 5/20; C08K 5/36; C08K 5/48; C08L 81/04

(52) U.S. Cl. ........................ 524/233; 524/210; 524/211; 524/227

(58) Field of Search ................................ 524/233, 210, 524/211, 227

(56) References Cited

U.S. PATENT DOCUMENTS

| | | | |
|---|---|---|---|
| 800,845 A | * | 4/1905 | Scoggin |
| 4,395,509 A | | 7/1983 | Blackwell et al. |
| 4,728,685 A | | 3/1988 | Bier et al. |
| 4,743,638 A | | 5/1988 | Bier et al. |
| 4,933,386 A | | 6/1990 | Nitoh et al. |
| 4,942,194 A | | 7/1990 | Bier et al. |
| 4,950,529 A | | 8/1990 | Ikeda et al. |

FOREIGN PATENT DOCUMENTS

| | | |
|---|---|---|
| EP | 0-330-488 | 2/1989 |
| JP | 58-204047 | 11/1983 |
| JP | 63-315655 | 12/1988 |
| JP | 01-051463 | 2/1989 |
| JP | 03-064359 | 3/1991 |

\* cited by examiner

*Primary Examiner*—Patrick Niland
(74) *Attorney, Agent, or Firm*—McDermott, Will & Emery

(57) ABSTRACT

A poly(arylene sulfide) resin composition comprising a poly(arylene sulfide) and, as a modifier, an organic amide compound compounded in a proportion of 0.2 to 10 parts by weight per 100 parts by weight of the poly(arylene sulfide).

7 Claims, No Drawings

POLYARYLENE SULFIDE RESIN COMPOSITION

TECHNICAL FIELD

The present invention relates to a poly(arylene sulfide) resin composition in which an organic amide is compounded as a modifier, and particularly to a poly(arylene sulfide) resin composition having excellent flowability and toughness.

According to the resin composition of the present invention, its glass transition temperature and cold crystallization temperature can be lowered while retaining the high melting point inherent in a poly(arylene sulfide), and so crystallization can be facilitated upon molding even when the temperature of a mold is lower than the usual temperature, and moreover molded products having excellent strength and good surface quality can be provided.

The resin composition according to the present invention has excellent melt-flow properties, tensile elongation and tensile strength in addition to the various excellent properties inherent in the poly(arylene sulfide), such as heat resistance, flame retardancy and chemical resistance, and is hence suitable for use as not only injection-molded products but also non-woven fabrics, monofilaments and the like.

BACKGROUND ART

Poly(arylene sulfides) (hereinafter abbreviated as "PAS") are aromatic polymers having predominant repeating units of arylene sulfide represented by the formula [—Ar—S—] in which Ar means an arylene group, and poly(phenylene sulfide) (hereinafter abbreviated as "PPS") is representative of the PAS. PAS is excellent in heat resistance, flame retardancy, chemical resistance, dimensional stability, mechanical properties and the like, and hence used in wide application fields.

However, the PAS involves a drawback that it is low in toughness typified by tensile elongation. The toughness of the PAS is improved by heightening its molecular weight. Since its melt viscosity is also increased at the same time, however, it is difficult to injection-mold it into precise molded products, molded products of complicated forms, and the like using molds narrow in channel and complicated in form. In particular, a PAS resin composition, in which a large amount of a filler such as glass fibers has been compounded, is improved in various properties such as mechanical properties, dimensional stability, heat resistance and electrical properties, but its melt viscosity is extremely increased, and so its melt-flow properties are deteriorated to a great extent. Accordingly, there is a limit to heightening the molecular weight of the PAS from the necessity of ensuring the flowability of the PAS upon molding, and so it has have no other choice but sacrifice its toughness.

The PAS generally has high glass transition temperature (Tg) and cold crystallization temperature (Tc). For example, PPS has a Tg of about 90° C. and a Tc of about 125° C. as measured by means of a differential scanning calorimeter (DSC). Therefore, in the case where the PAS is used to obtain a molded product by injection molding, it has been necessary to use a mold heated to a high temperature of generally 120° C. or higher, often 130° C. or higher in order to facilitate its crystallization and provide a molded product having good appearance. Since the molding operation is conducted at a mold temperature of about 100° C. in the usual injection molding making use of a general-purpose resin, however, there has been a problem that special equipment and fuel must be used in order to raise the mold temperature to a high temperature of 120° C. or higher.

In addition, in order to produce a molded product excellent in hardness, dimensional stability and form stability in the injection molding of the PAS, it is preferred to achieve a high degree of crystallinity as soon as possible. However, even when the high degree of crystallinity is quickly achieved by raising a mold temperature to a comparatively high temperature, there has been a limit to the shortening of an injection molding cycle to enhance productivity, since the residence time of the resulting molded product in the mold lengthens.

As means for crystallizing the PAS at a high speed, there have heretofore been proposed, for example, a method in which a monomeric carboxylic ester is added (Japanese Patent Application Laid-Open No. 230848/1987), a method in which a thioether is added (Japanese Patent Application Laid-Open No. 230849/1987), and a method in which an aromatic phosphoric ester is added (Japanese Patent Application Laid-Open Nos. 230850/1987 and 225660/1989). However, the additives used in these methods are poor in heat resistance, and so evaporated gases or decomposed gases are generated upon molding and processing. Therefore, these methods are not preferred from the viewpoint of practical use.

The PAS is expected to develop its uses to not only a field of injection-molded products, but also a field of high-performance filters of which high heat resistance, flame retardancy, chemical resistance and the like are required, making good use of its various excellent properties.

In general, a non-woven fabric or porous body is used as a filter composed of a polymeric material. In order to obtain a high-performance filter composed of the non-woven fabric, it is preferred from the viewpoints of collection efficiency and pressure loss that the fineness of fibers making up the non-woven fabric be fine in addition to the fact that the various properties of a polymeric material itself used are excellent. Therefore, if a non-woven fabric can be produced from a PAS by a melt blow process by which a non-woven fabric composed of extremely fine fibers can be produced, the uses of the PAS can be developed to new fields of high-performance filters and the like.

Some proposals have heretofore been made on methods for producing a non-woven fabric formed of extremely fine fibers by a melt blow process in order to apply the PAS to uses such as filters. For example, Japanese Patent Application Laid-Open No. 315655/1988 discloses a melt-blow non-woven PPS fabric, wherein the non-woven fabric is composed of PPS fibers having an average fineness of at most 0.5 deniers, part of the fibers are at least fusion-bonded or entangled, and its coefficient of variation in METSUKE (mass per unit area) is at most 7%. Japanese Patent Application Laid-Open No. 22985/1989 discloses a non-woven PAS fabric, which is composed of PAS fibers having an average fiber diameter of 0.1 to 0.8 $\mu$m and has a METSUKE of 5 to 500 g/m².

However, the melt-blow non-woven PAS fabrics obtained by these conventional techniques have involved drawbacks that when the degree of crystallinity of the PAS is enhanced in order to improve its chemical resistance and dimensional stability, the toughness typified by tensile elongation is deteriorated, and that sufficient strength cannot be achieved. More specifically, the conventional melt-blow non-woven PAS fabrics have involved the following problems.

In the melt blow process, a thermoplastic resin is generally melted and ejected from a minute orifice, the thus-ejected melt is blown off by a heated gas in a sonic velocity region to form fine fibers, and the fibers are collected on a moving porous drum or screen to produce a non-woven fabric. In order to form highly thinned fibers by the action of the heated gas in the sonic velocity region, it is said that to lower the melt viscosity of the thermoplastic resin used is indispensable. Accordingly, in order to produce a non-woven fabric formed of extremely fine fibers narrow in scatter of fineness by the melt blow process using the PAS, it has been necessary to use a PAS having a low melt viscosity.

On the other hand, in order to sufficiently develop excellent chemical resistance and dimensional stability, which are characteristic of the PAS, in the melt-blow non-woven fabric, it is desirable to enhance the degree of crystallinity of the PAS. However, a melt-blow non-woven fabric obtained by using a PAS having a low melt viscosity is extremely deteriorated in toughness if the degree of crystallinity of the PAS is enhanced by controlling melt-blow conditions and heat-treatment conditions, so that such a non-woven fabric cannot be practically used. On the other hand, when a PAS having a high melt viscosity is used, not only extremely fine fibers cannot be formed by melt blowing, but also a scatter of fineness becomes wide. To raise a die temperature upon melt blowing for lowering the apparent melt viscosity of the PAS has involved a problem that a gel-like substance formed due to deterioration by heat causes clogging of a die, resulting in a failure to continuously run over a long period of time.

A monofilament making use of a PAS has been developed. However, this monofilament has also involved many problems. More specifically, it is necessary to use a high-molecular weight PAS in order to obtain a PAS monofilament having good tensile strength and knot strength. In addition, since it is necessary to stably conduct stretching in a stretching step for the purpose of providing a monofilament narrow in scatter of fiber diameter, a PAS having a comparatively high melt elasticity must be used. However, the use of a PAS high in both molecular weight and melt elasticity has involved a problem that a part of the PAS is extruded without being fully melted in an extruder in an extruding step of melt-extruding the PAS into a fibrous form, and this unmelted portion is mixed in a melt to form the cause that the fiber diameter varies in the subsequent stretching step. To raise an extrusion temperature to apply sufficient heat to the PAS for uniformly melting the PAS in the extruder has involved a drawback that a part of the PAS undergoes deterioration by heat to form a gel-like substance, resulting in a failure to continuously run over a long period of time.

DISCLOSURE OF THE INVENTION

It is an object of the present invention to provide a PAS resin composition having both properties of good flowability and high toughness which are contrary to each other.

Another object of the present invention is to provide a PAS resin composition by which evaporated gases or decomposed gases are scarcely generated upon molding and processing, and its glass transition temperature and cold crystallization temperature can be lowered while retaining the high melting point inherent in the PAS, whereby crystallization can be facilitated while retaining its high heat resistance to provide molded products having excellent strength and good surface quality even at a lower mold temperature.

A further object of the present invention is to provide various kinds of molded or formed products such as injection-molded products, non-woven fabrics, multifilaments and monofilaments using a resin composition having excellent melt-flow properties, tensile elongation and tensile strength in addition to the various excellent properties inherent in the PAS, such as heat resistance, flame retardancy and chemical resistance.

The present inventors have carried out an extensive investigation with a view toward overcoming the above-described problems involved in the prior art. As a result, it has been found that when an organic amide compound is compounded as a modifier in a specific proportion into a PAS, the flowability (melt-flow properties) and toughness of the PAS can be improved by leaps and bounds, and moreover the glass transition temperature and cold crystallization temperature can be lowered while retaining the high melting point inherent in the PAS, whereby crystallization can be facilitated while retaining high heat resistance to provide molded products having good surface quality even at a low mold temperature of about 100° C.

When the PAS resin composition according to the present invention is applied to the production of a melt-blow non-woven fabric, a melt-blow non-woven PAS fabric, which has excellent toughness even in a state that the degree of crystallinity of the PAS has been enhanced, in addition to the excellent heat resistance, flame retardancy, chemical resistance and the like inherent in the PAS, and is high in tensile strength and thin in fiber diameter, can be obtained. Since the use of the PAS resin composition according to the present invention, which is excellent in melt-flow properties, permits lowering its apparent melt viscosity and uniformly and stably melting the PAS in an extruder, the problem that a gel-like substance formed due to deterioration by heat causes clogging of a die, resulting in a failure to continuously run over a long period of time, can also be solved.

When the PAS resin composition according to the present invention is applied to the production of a monofilament, a monofilament narrow in scatter of fiber diameter in addition to the excellent heat resistance, flame retardancy, chemical resistance and the like inherent in the PAS can be obtained. In addition, the production can be conducted stably and continuously over a long period of time. Since the PAS resin composition according to the present invention can prevent the PAS from lowering its molecular weight in an extruder and has excellent melt-flow properties, a monofilament improved in tensile strength and knot strength can be provided by using a high-molecular weight PAS.

The present invention has been led to completion on the basis of these findings.

According to the present invention, there is thus provided a poly(arylene sulfide) resin composition comprising a poly(arylene sulfide) and, as a modifier, an organic amide compound compounded in a proportion of 0.2 to 10 parts by weight per 100 parts by weight of the poly(arylene sulfide).

The resin composition according to the present invention may further comprise 0 to 800 parts by weight of a filler as needed.

The organic amide compound may preferably be at least one compound selected from the group consisting of N-alkylpyrrolidones, N-cycloalkylpyrrolidones, N-alkylcaprolactams, N-cycloalkylcaprolactams, caprolactams and N,N-dialkylimidazolidinones.

According to the present invention, there are also provided various kinds of molded or formed products, such as an injection-molded product, a non-woven fabric, a multifilament and a monofilament, composed of the resin composition.

BEST MODE FOR CARRYING OUT THE INVENTION

Poly(Arylene Sulfide) (PAS):

The PAS useful in the practice of the present invention is an aromatic polymer having predominant repeating units of arylene sulfide represented by the formula [—Ar—S—] in which Ar means an arylene group. When a repeating unit [—Ar—S—] is defined as 1 mole (basal mole), the PAS used in the present invention is a polymer containing this repeating unit in a proportion of generally at least 50 mol %, preferably at least 70 mol %, more preferably at least 90 mol %.

As examples of the arylene group, may be mentioned a p-phenylene group, a m-phenylene group, substituted phenylene groups (the substituent being preferably an alkyl group having 1 to 6 carbon atoms or a phenyl group), a p,p'-diphenylene sulfone group, a p,p'-biphenylene group, a p,p'-diphenylenecarbonyl group and a naphthylene group. As the PAS, a polymer predominantly having only the same arylene groups may preferably be used. However, a copolymer having two or more different arylene groups may be used from the viewpoint of processability and heat resistance.

Among these PASs, PPS having predominant repeating units of p-phenylene sulfide is particularly preferred because it is excellent in processability and industrially available with ease. Besides the PPS, poly(arylene ketone sulfides), poly(arylene ketone ketone sulfide) and the like may be used. As specific examples of copolymers, may be mentioned random or block copolymers having repeating units of p-phenylene sulfide and repeating units of m-phenylene sulfide, random or block copolymers having repeating units of phenylene sulfide and repeating units of arylene ketone sulfide, random or block copolymers having repeating units of phenylene sulfide and repeating units of arylene ketone ketone sulfide, and random or block copolymers having repeating units of phenylene sulfide and repeating units of arylene sulfone sulfide. These PASs are preferably crystalline polymers. Besides, the PASs are preferably linear polymers from the viewpoints of toughness and strength.

Such a PAS can be obtained in accordance with any known process (for example, Japanese Patent Publication No. 33775/1988) in which an alkali metal sulfide and a dihalogen-substituted aromatic compound are subjected to a polymerization reaction in a polar solvent.

As examples of the alkali metal sulfide, may be mentioned lithium sulfide, sodium sulfide, potassium sulfide, rubidium sulfide and cesium sulfide. Sodium sulfide formed by the reaction of NaSH and NaOH in the reaction system may also be used.

As examples of the dihalogen-substituted aromatic compound, may be mentioned p-dichlorobenzene, m-dichlorobenzene, 2,5-dichlorotoluene, p-dibromobenzene, 2,6-dichloronaphthalene, 1-methoxy-2,5-dichlorobenzene, 4,4'-dichlorobiphenyl, 3,5-dichlorobenzoic acid, p,p'-dichlorodiphenyl ether, 4,4'-dichlorodiphenyl sulfone, 4,4'-dichlorodiphenyl sulfoxide and 4,4'-dichlorodiphenyl ketone. These compounds may be used either singly or in any combination thereof.

In order to introduce some branched or crosslinked structure into the PAS, a small amount of a polyhalogen-substituted aromatic compound having at least 3 halogen substituents per molecule may be used in combination. As preferable examples of the polyhalogen-substituted aromatic compounds, may be mentioned trihalogen-substituted aromatic compounds such as 1,2,3-trichlorobenzene, 1,2,3-tribromobenzene, 1,2,4-trichlorobenzene, 1,2,4-tribromobenzene, 1,3,5-trichlorobenzene, 1,3,5-tribromobenzene and 1,3-dichloro-5-bromobenzene, and alkyl-substituted derivatives thereof. These compounds may be used either singly or in any combination thereof. Among these, 1,2,4-trichlorobenzene, 1,3,5-trichlorobenzene and 1,2,3-trichlorobenzene are preferred from the viewpoints of economy, reactivity, physical properties and the like.

As the polar amide solvent, aprotic organic amide solvents typified by N-alkylpyrrolidones such as N-methyl-2-pyrrolidone, 1,3-dialkyl-2-imidazolidinone, tetraalkylureas, and hexaalkylphosphoric triamides are preferred because they have high stability in the reaction system and are easy to provide a high-molecular weight polymer.

No particular limitation is imposed on the molecular weight of the PAS, and any polymer from a low-molecular weight polymer to a high-molecular weight polymer may be used. In the case of, for example, PPS, the melt viscosity (measured at 310° C. and a shear rate of 1,200/sec) may be generally 5 to 600 Pa·s, preferably 10 to 400 Pa·s, more preferably 20 to 300 Pa·s. In the present invention, flowability can be improved even when a PAS having a comparatively high molecular weight, i.e., a high melt viscosity, is used. When a filler is filled in a high proportion, however, it is preferred from the viewpoint of molding or forming ability to use a PAS having a comparatively low melt viscosity.

By the way, the conventional PAS is first separated from the polar solvent in an after-treatment step after polymerization, and further washed, thereby removing the polar solvent therefrom. Therefore, the content of the polar solvent remaining in the polymer is as low as generally 0.003 wt. % or lower. NMP is only contained in an extremely low proportion of about 50 to 100 ppm in commercially available PPS products. The reason for it is that the polar solvents such as NMP are recovered after polymerization to reuse them, and besides that the polymers are subjected to a consistent washing treatment so as to provide high-quality polymers by removing oligomer, unreacted monomers, by-products, impurities and the like as much as possible. The polar solvents remaining in the PAS formed are also removed by the washing treatment.

Accordingly, the polar solvents such as NMP have heretofore not been caused to remain in a comparatively large amount in the PAS. Of course, it has heretofore not been conducted to compound an organic amide compound as a modifier into the PAS. On the other hand, the PAS resin composition according to the present invention is prepared by adding an organic amide compound as a modifier to a purified PAS after polymerization.

Organic Amide Compound:

Examples of the organic amide compound used as a modifier in the present invention include amides such as N,N-dimethylformamide and N,N-dimethylacetamide; N-alkylpyrrolidones or N-cycloalkylpyrrolidones such as N-methyl-2-pyrrolidone (hereinafter abbreviated as "NMP") and N-cyclohexyl-2-pyrrolidone; N-alkylcaprolactams or N-cyclo-alkylcaprolactams such as N-methyl-ε-caprolactam and N-cyclohexylcaprolactam; caprolactams such as ε-caprolactam; N,N-dialkylimidazolidinones such as 1,3-dimethyl-2-imidazolidinone; tetraalkylureas such as tetramethylurea; and hexaalkylphosphoric triamides such as hexamethyl-phosphoric triamide. These organic amide compounds may be used either singly or in any combination thereof.

Of the organic amide compounds, the N-alkylpyrrolidones, N-cycloalkylpyrrolidones, N-alkylcaprolactams, N-cycloalkylcaprolactams, caprolactams and N,N-dialkylimidazolidinones are preferred, with the N-alkylpyrrolidones, caprolactams and N,N-dialkylimidazolidinones being particularly preferred.

The organic amide compound used as a modifier in the present invention is compounded in a proportion of 0.2 to 10 parts by weight, preferably 0.5 to 8 parts by weight, more preferably 1 to 6 parts by weight per 100 parts by weight of the PAS. If the compounding proportion of the organic amide compound is too low, the effects of improving the flowability and toughness become little, and the effects of lowering the glass transition temperature and cold crystallization temperature also become little. If the compounding proportion of the organic amide compound is too high, the strength of the resulting composition is deteriorated, and there is a possibility that unfavorable phenomena such as bleeding may be caused.

Filler:

In the resin compositions according to the present invention, a filler is not always an essential component. In order to provide molded or formed products excellent in various properties such as mechanical strength, heat resistance, dimensional stability and electrical properties, however, it is preferred to compound various kinds of fillers according to the purposes thereof. According to the present invention, marked effects can be exhibited even in filled resin compositions.

As examples of the fillers, may be mentioned fibrous fillers, such as inorganic fibrous materials such as glass fibers, carbon fibers, asbestos fibers, silica fibers, alumina fibers, zirconia fibers, boron nitride fibers, silicon nitride fibers, boron fibers and potassium titanate fibers; metallic fibrous materials such as stainless steel, aluminum, titanium, copper and brass; and high-melting organic fibrous materials such as polyamide, fluorocarbon resins, polyester resins and acrylic resins.

Examples of other fillers include particulate or powdery fillers such as mica, silica, talc, alumina, kaolin, calcium sulfate, calcium carbonate, titanium oxide, carbon black, graphite, ferrite, clay, glass powder, zinc oxide, nickel carbonate, iron oxide, quartz powder, magnesium carbonate and barium sulfate.

These fillers may be use either singly or in any combination thereof. The fillers may be treated with greige goods or surface-treating agents as needed. Examples of the greige goods or surface-treating agents include functional compounds such as epoxy compounds, isocyanate compounds, silane compounds and titanate compounds. These compounds may be used for conducting a surface treatment or collecting treatment in advance or added at the same time upon the preparation of a resin composition.

The proportion of the filler used is generally 0 to 800 parts by weight, preferably 5 to 700 parts by weight, more preferably 10 to 300 parts by weight per 100 parts by weight of the PAS though it varies according to the kind and specific gravity thereof, the purpose of use, application fields, and the like. If the compounding proportion of the filler is too low, the filling effect thereof becomes little. If the proportion is too high on the other hand, a problem arises on molding or forming ability, and besides the mechanical strength of a molded or formed product obtained from such a composition may be deteriorated in some cases.

Other Compounding Additives:

Into the resin compositions according to the present invention, may be compounded other thermoplastic resins, as needed. The other thermoplastic resins are preferably thermoplastic resins stable under high-temperature conditions that the PAS is melt-processed. As specific examples of the thermoplastic resins, may be mentioned aromatic polyesters such as polyethylene terephthalate and polybutylene terephthalate; fluorocarbon resins such as polytetrafluoroethylene, tetrafluoroethylene/hexafluoropropylene copolymers, tetrafluoroethylene/perfluoroalkyl vinyl ether copolymers, polychlorotrifluoroethylene, polyvinylidene fluoride, polyvinylidene fluoride/hexafluoropropylene copolymers, propylene/tetrafluoroethylene copolymers, vinylidene fluoride/chlorotrifluoroethylene copolymers and ethylene/hexafluoropropylene copolymers; and polyacetal, polystyrene, polyamide, polycarbonate, polyphenylene ether, polyalkyl acrylate, ABS resins and polyvinyl chloride. These thermoplastic resins may be used either singly or in any combination thereof.

Into the resin compositions according to the present invention, may also be compounded impact modifiers such as epoxy group-containing α-olefin copolymers; silane coupling agents such as aminoalkoxysilane compounds; resin-modifying agents such as ethyleneglycidyl methacrylate; lubricants such as pentaerythritol tetrastearate; thermosetting resins; stabilizers such as antioxidants and ultraviolet absorbents; nucleating agents such as boron nitride; flame retardants; colorants such as dyes and pigments; and the like, as needed.

Resin Composition:

The resin compositions according to the present invention can be prepared by equipment and methods generally used in the preparation of synthetic resin compositions. More specifically, necessary components can be mixed and kneaded in a single-screw or twin-screw extruder and extruded into pellets for molding. There may also be used a method in which part of the necessary components are mixed as a masterbatch, and the mixture is molded, or a method in which part of raw materials used are ground for the purpose of successfully conducting dispersion and mixing of the individual components, thereby making the particle sizes of the components uniform, and they are mixed and melt-extruded.

Since a PAS can be synthesized by using an organic amide compound as a polar solvent, the same organic amide compound as that used as the polar solvent may be mixed with the PAS obtained by removing oligomers, unreacted monomer(s), by-products, impurities, etc. in accordance with a method known per se in the art after the polymerization, so as to amount to a predetermined proportion.

Since the PAS resin compositions according to the present invention have excellent melt-flow properties and toughness, and their glass transition temperatures and cold crystallization temperatures are lowered while retaining the high melting point inherent in the PAS, molded products having sufficient strength and toughness, and good surface quality can be provided by using a lower-temperature mold.

The PAS resin compositions according to the present invention also have excellent melt-flow properties, tensile elongation and tensile strength in addition to the various excellent properties inherent in PAS, such as heat resistance, flame retardancy and chemical resistance, and are hence suitable for use as non-woven fabrics, monofilaments and the like.

A spun bond process or melt blow process may be adopted to produce a non-woven fabric using the PAS resin composition according to the present invention, thereby obtaining a non-woven fabric which is composed of extremely fine fibers, narrow in scatter of fineness and excellent in heat resistance, flame retardancy, chemical resistance, toughness, tensile strength, dimensional stability and the like. The non-woven PAS fabric according to the present invention is suitable for use as a high-performance filter.

The PAS resin compositions according to the present invention can be formed into monofilaments in accordance with a method know per se in the art. The PAS resin compositions according to the present invention are excellent in melt-flow properties, and so monofilaments narrow in scatter of fiber diameter can be stably produced therefrom even when using a PAS high in both molecular weight and melt elasticity. The PAS monofilaments according to the present invention have excellent heat resistance, flame retardancy, chemical resistance, tensile strength, knot strength and the like.

EXAMPLES

The present invention will hereinafter be described more specifically by the following Synthesis Examples, Examples and Comparative Examples. It should however be borne in mind that the present invention is not limited by these examples only.

Physical properties in the examples were measured in accordance with the following respective methods.

(1) Melt Viscosity:

Measurement was conducted under conditions of a temperature of 310° C. and a shear rate of 1,200/sec by means of a "Capirograph" (manufactured by Toyo Seiki Seisakusho, Ltd.).

(2) Glass Transition Temperature (Tg), Cold Crystallization Temperature (Tc) and Melting Point (Tm):

With respect to a sheet obtained by hot-pressing pellets produced by melt extrusion at 310° C. and then quenching the pressed sheet, the glass transition temperature (Tg), cold crystallization temperature (Tc) and melting point (Tm) were measured. More specifically, the sheet sample was held at 30° C. for 3 minutes in a nitrogen atmosphere by means of a differential scanning calorimeter (DSC; manufactured by Perkin Elmer Co.) and then heated to 340° C. at a rate of 10° C./min, thereby measuring them.

(3) Tensile Properties (Tensile Strength and Tensile Elongation):

Measurement was conducted under conditions of a gauge length of 50 mm and a cross-head speed of 5 mm/min in accordance with ASTM D 638 by using pellets produced by melt extrusion to producing a specimen by injection molding.

(4) Weight Average Molecular Weight (Mw):

Pellets produced by melt extrusion were used to determine the weight average molecular weight of each sample by gel permeation chromatography (GPC method). The measurement conditions are as follows:

While passing 1-chloronaphthalene at a flow rate of 0.7 ml/min through a measuring apparatus equipped with an injector, pump, column (SHODEX AT80 M/S, 2 columns) and hydrogen flame ionization detector (FID), the sample prepared into a 1-chloronaphthalene solution at a concentration of 0.005 wt. % was poured into the apparatus to analyze it. The calibration of the molecular weight was conducted with standard polystyrene and Ph-S-(Ph-S)$_3$-Ph (wherein Ph means a phenyl or phenylene group), and data processing was conducted by means of a SIC7000B manufactured by System Instrument Co.

(5) Content of Organic Amide Compound:

Pellets produced by melt extrusion were treated at 330° C. for 15 minutes in a concentrator of a gas chromatograph (purge and trap GC) equipped with a component concentrator and a pyrolyzer, and an organic amide compound and other gas components generated during this treatment were trapped at −40° C. to quantify the organic amide compound by a gas chromatographic analysis. With respect to resin compositions to which an organic amide compound was added as a modifier, the content of the organic amide compound was expressed to one place of decimals, while the content of the organic amide compound (NMP used as a solvent for polymerization) in resin compositions, to which no organic amide compound was added, was expressed to three places of decimals because such a compound was contained in an extremely small quantity.

(6) Evaluation by Low-Temperature Mold:

Pellets produced by melt extrusion were injection-molded at a mold temperature of 105° C. to produce a specimen. The specimen thus obtained was visually observed to rank its surface gloss in accordance with the following standard:

⊚: Excellent in gloss;

○: Good in gloss; and

X: Poor in gloss.

Synthesis Example 1

Synthesis of Polymer A

A polymerizer was charged with 720 kg of N-methyl-2-pyrrolidone (NMP) and 420 kg of sodium sulfide pentahydrate containing 46.21 wt. % of sodium sulfide (Na$_2$S). After purged with nitrogen gas, the temperature of the reaction system was gradually raised to 200° C. with stirring to distill off 158 g of water. At this time, 62 moles of H$_2$S were volatilized off. After the dehydration step described above, the polymerizer was charged with 371 kg of p-dichlorobenzene (hereinafter abbreviated as "pDCB") and 189 kg of NMP to conduct a reaction at 220° C. for 4.5 hours with stirring. While continuing the stirring, 49 kg of water were then introduced under pressure into the polymerizer, and the contents were heated to 255° C. to conduct a reaction for 5 hours. After completion of the reaction, the reaction mixture was cooled near to room temperature, and the contents were sifted through a screen of 100 mesh to collect a granular polymer. The thus-collected granular polymer was washed twice with acetone and 3 times with water, thereby obtaining a washed polymer. This washed polymer was further washed with a 3 wt. % aqueous solution of ammonium chloride and then washed with water. After dehydration, the collected granular poly(phenylene sulfide) (Polymer A) was dried at 105° C. for 3 hours. The yield of Polymer A thus obtained was 92%, and its melt viscosity was 55 Pa·s.

Synthesis Example 2

Synthesis of Polymer B

A polymerizer was charged with the same components as those used in Synthesis Example 1 to conduct dehydration. As a result, 160 kg of water and 62 moles of H$_2$S were distilled off. The polymerizer was then charged with 364 kg of pDCB and 250 kg of NMP to conduct a reaction at 220° C. for 4.5 hours with stirring. Thereafter, a polymerization reaction and an after treatment were conducted in the same manner as in Synthesis Example 1 except that the amount of water introduced under pressure with stirring was changed to 59 kg, thereby obtaining granular poly(phenylene sulfide) (Polymer B). The yield of Polymer B thus obtained was 89%, and its melt viscosity was 140 Pa·s.

Synthesis Example 3

Synthesis of Polymer C

A polymerizer was charged with 800 kg of NMP and 390 kg of sodium sulfide pentahydrate containing 46.40 wt. % of Na$_2$S to conduct a dehydration treatment in the same manner as in Synthesis Example 1. As a result, 147 kg of water and 57 moles of H$_2$S were distilled off. The polymerizer was then charged with 339 kg of pDCB, 218 kg of NMP and 9.2 kg of water to conduct a reaction at 220° C. for 4.5 hours with stirring. While continuing the stirring, 70 kg of water were then introduced under pressure into the polymerizer, and the contents were heated to 255° C. to conduct a reaction for 3 hours. The reaction was then continued at 245° C. for 8 hours. After completion of the reaction, the reaction mixture was treated in the same manner as in Synthesis Example 1 to obtain granular poly(phenylene sulfide) (Polymer C). The yield of Polymer C thus obtained was 90%, and its melt viscosity was 236 Pa·s.

Synthesis Example 4

Synthesis of Polymer D

A polymerizer was charged with 800 kg of NMP and 373 kg of sodium sulfide pentahydrate containing 46.10 wt. % of $Na_2S$ to conduct a dehydration treatment in the same manner as in Synthesis Example 1. As a result, 142 kg of water and 54 moles of $H_2S$ were distilled off. The polymerizer was then charged with 320 kg of pDCB, 0.79 kg of 1,2,4-trichlorobenzene, 274 kg of NMP and 0.9 kg of water to conduct a reaction at 220° C. for 1 hour with stirring, and then at 230° C. for 3 hours. While continuing the stirring, 77 kg of water were then introduced under pressure into the polymerizer, and the contents were heated to 255° C. to conduct a reaction for 1 hour. The reaction was then continued at 245° C. for 3 hours. After completion of the reaction, the reaction mixture was cooled near to room temperature, and the contents were sifted through a screen of 100 mesh to collect a granular polymer. The thus-collected granular polymer was washed twice with acetone and 4 times with water, thereby obtaining washed poly(phenylene sulfide) (Polymer D). After dehydration, the collected granular polymer was dried at 105° C. for 3 hours. The yield of Polymer D thus obtained was 90%, and its melt viscosity was 517 Pa·s.

Synthesis Example 5

Synthesis of Polymer E

A polymerizer was charged with the same components as those used in Synthesis Example 1 to conduct dehydration. As a result, 157 kg of water and 62 moles of $H_2S$ were distilled off. Thereafter, a polymerization reaction and an after treatment were conducted in the same manner as in Synthesis Example 1 except that the polymerizer was then charged with 374 kg of pDCB and 189 kg of NMP, thereby obtaining granular poly(phenylene sulfide) (Polymer E). The yield of Polymer E thus obtained was 93%, and its melt viscosity was 28 Pa·s.

Synthesis Example 6

Synthesis of Polymer F

A dehydration treatment and a polymerization reaction were conducted in the same manner as in Synthesis Example 2 except that the amount of pDCB used was changed to 360 kg. After completion of the reaction, the reaction mixture was cooled near to room temperature, and the contents were sifted through a screen of 100 mesh to collect a granular polymer. The thus-collected granular polymer was washed twice with acetone and 4 times with water, thereby obtaining poly(phenylene sulfide) (Polymer F). After dehydration, the collected granular polymer was dried at 105° C. for 3 hours. The yield of Polymer F thus obtained was 89%, and its melt viscosity was 210 Pa·s.

Example 1

After 98 wt. % of Polymer A and 2 wt. % of NMP were uniformly dry blended in a Henschel mixer, the resultant blend was fed to a twin-screw kneader extruder (PCM-45, manufactured by Ikegai Corp.) having a barrel diameter of 45 mm and kneaded at a cylinder temperature of 260 to 330° C., thereby producing pellets. The pellets thus obtained were dried at 150° C. for 6 hours and then molded at a mold temperature of 145° C. and a cylinder temperature of 300 to 320° C. by an injection molding machine (IS-75, manufacture by Toshiba Machine Co., Ltd.) to form specimens for tensile test. The formulation of the resin composition and the measured results of physical properties thereof are shown in Table 1.

Examples 2 to 7 and Comparative Examples 1 to 4

Respective pellets were produced in the same manner as in Example 1 except that the respective resin components and NMP were used in their corresponding amounts shown in Table 1, thereby forming specimens for tensile test. The formulations of the respective resin compositions and the measured results of physical properties thereof are shown in Table 1.

TABLE 1

| | Formulation of resin composition (wt. %) | | | | | Physical properties of resin composition | | | | | | | |
|---|---|---|---|---|---|---|---|---|---|---|---|---|---|
| | Poly(arylene sulfide) | | | | Organic amide | Melt viscosity | Tg | Tc | Tm | Tensile strength | Tensile elongation | Molecular weight | Content of NMP |
| | A | B | C | D | NMP | (Pa·s) | (° C.) | (° C.) | (° C.) | (MPa) | (%) | (Mw) | (wt. %) |
| Ex. 1 | 98 | — | — | — | 2 | 36 | 75 | 111 | 279 | 70 | 2.1 | 38,500 | 1.6 |
| Comp. Ex. 1 | 100 | — | — | — | 0 | 52 | 86 | 126 | 280 | 65 | 1.9 | 38,000 | 0.003 |
| Ex. 2 | — | 98 | — | — | 2 | 99 | 78 | 123 | 276 | 79 | 3.1 | 52,000 | 1.5 |
| Comp. Ex. 2 | — | 100 | — | — | 0 | 130 | 88 | 129 | 277 | 76 | 2.5 | 50,000 | 0.004 |
| Ex. 3 | — | — | 98 | — | 2 | 167 | 79 | 117 | 274 | 90 | 7.0 | 70,000 | 1.5 |
| Ex. 4 | — | — | 96 | — | 4 | 115 | 74 | 110 | 276 | 89 | 18.0 | 70,500 | 2.8 |
| Comp. Ex. 3 | — | — | 100 | — | 0 | 216 | 89 | 125 | 277 | 84 | 3.2 | 69,000 | 0.005 |
| Ex. 5 | — | — | — | 99 | 1 | 247 | 85 | 135 | 272 | 89 | 48.0 | 78,500 | 0.7 |
| Ex. 6 | — | — | — | 97 | 3 | 193 | 76 | 127 | 272 | 88 | 62.0 | 82,600 | 2.5 |
| Ex. 7 | — | — | — | 95 | 5 | 180 | 73 | 126 | 272 | 88 | 75.0 | 84,300 | 2.8 |
| Comp. Ex. 4 | — | — | — | 100 | 0 | 340 | 90 | 140 | 272 | 90 | 32.0 | 78,000 | 0.004 |

Example 8

Pellets were produced in the same manner as in Example 1 except that 59 wt. % of Polymer A obtained in Synthesis Example 1, 1 wt. % of NMP and 40 wt. % of glass staple fibers (product of Nippon Electric Glass Co., Ltd.; diameter: 13 μm) were used, thereby forming specimens for tensile test. In order to investigate the properties of a molded product obtained by means of a low-temperature mold, injection molding was further conducted in the same manner as in Example 1 except that the mold temperature was changed to 105° C., thereby visually observing the specimen thus obtained to rank its surface gloss. The formulation of the resin composition and the measured results of physical properties thereof are shown in Table 2.

Examples 9 to 11 and Comparative Examples 5 to 7

Respective pellets were produced in the same manner as in Example 8 except that the respective resin components, NMP and glass staple fibers were used in their corresponding amounts shown in Table 2, thereby forming specimens for tensile test. The formulations of the respective resin compositions and the measured results of physical properties thereof are shown in Table 2.

TABLE 2

|  | Formulation of resin composition (wt. %) | | | | | Physical properties of resin composition | | | | | | | |
|---|---|---|---|---|---|---|---|---|---|---|---|---|---|
|  | Poly(arylene sulfide) | | Organic amide | | Filler | Melt viscosity | Tg | Tc | Tm | Tensile strength | Tensile elongation | Content of NMP | Evaluation by low-temperature |
|  | A | B | E | NMP | GF (*1) | (Pa · s) | (° C.) | (° C.) | (° C.) | (MPa) | (%) | (wt. %) | mold |
| Ex. 8 | 59 | — | — | 1 | 40 | 120 | 78 | 110 | 279 | 175 | 1.5 | 0.7 | ○ |
| Ex. 9 | 57 | — | — | 3 | 40 | 95 | 75 | 106 | 179 | 183 | 1.5 | 2.0 | ◎ |
| Ex. 5 | — | — | 60 | 0 | 40 | 110 | 86 | 119 | 281 | 130 | 0.9 | 0.003 | X |
| Comp. Ex. 6 | 60 | — | — | 0 | 40 | 145 | 86 | 118 | 280 | 170 | 1.5 | 0.004 | X |
| Ex. 10 | — | 59 | — | 1 | 40 | 257 | 83 | 122 | 277 | 170 | 1.8 | 0.6 | ○ |
| Ex. 11 | — | 57 | — | 3 | 40 | 205 | 77 | 112 | 277 | 185 | 1.9 | 1.9 | ◎ |
| Comp. Ex. 7 | — | 60 | — | 0 | 40 | 291 | 85 | 124 | 278 | 160 | 1.7 | 0.005 | X |

(*1) Glass staple fibers (product of Nippon Electric Glass Co., Ltd.; diameter: 13 μm)

Example 12

Pellets were produced in the same manner as in Example 1 except that Polymer A and NMP were changed to Polymer B and ε-caprolactam, respectively, thereby forming specimens for tensile test. The formulation of the resin composition and the measured results of physical properties thereof are shown in Table 3.

Example 13

Pellets were produced in the same manner as in Example 1 except that Polymer A and NMP were changed to Polymer B and 1,3-dimethyl-2-imidazolidinone, respectively, thereby forming specimens for tensile test. The formulation of the resin composition and the measured results of physical properties thereof are shown in Table 3.

TABLE 3

|  | Formulation of resin composition (wt. %) | | | Physical properties of resin composition | | | | | | | |
|---|---|---|---|---|---|---|---|---|---|---|---|
|  |  | Organic amide | | Melt | | | | | Tensile | | Content of |
|  | Poly(arylene sulfide) B | ε-Caprolactam | 1,3-Dimethyl-2-imidazolidinone | viscosity (Pa · s) | Tg (° C.) | Tc (° C.) | Tm (° C.) | Tensile strength (MPa) | elongation (%) | Molecular weight (Mw) | organic amide (wt. %) |
| Ex. 12 | 98 | 2 | — | 94 | 77 | 121 | 277 | 80 | 4.5 | 52,000 | 1.6 |
| Ex. 13 | 98 | — | 2 | 105 | 80 | 123 | 278 | 79 | 3.8 | 52,000 | 1.3 |

Example 14

After 98 wt. % of Polymer F obtained in Synthesis Example 6 and 2 wt. % of ε-caprolactam were uniformly dry blended in a Henschel mixer, the resultant blend was fed to a twin-screw kneader extruder (PCM-45, manufactured by Ikegai Corp.) having a barrel diameter of 45 mm and kneaded at a cylinder temperature of 260 to 330° C., thereby obtaining pellets.

The pellets thus obtained were dried at 150° C. for 6 hours and then fed to a single-screw extruder having a barrel diameter of 40 mm and equipped with a melt-blow die composed of 300 nozzles each having a nozzle diameter of 0.3 mm to melt-blow them under conditions of a resin temperature (spinning temperature) upon passing through the melt-blow die of 320° C., a discharge rate of 0.1 g/min/nozzle, a gas temperature of 350° C. and an air flow rate of 3 $Nm^3$/min, thereby producing a non-woven fabric. As a result, a melt-blow non-woven PPS fabric having an average fineness of 3.5 μm and a METSUKE of 150 g/$m^2$ and causing no shot was able to be obtained.

This non-woven fabric was heat-treated at 150° C. for 5 hours and cut into strips 2 cm wide to conduct a tensile test under conditions of a measuring temperature of 23° C., a gauge length of 50 mm and a cross-head speed of 5 mm/min, thereby determining its tensile strength. As a result, the tensile strength was found to be 1.3 kg/cm.

Comparative Example 8

After Polymer F obtained in Synthesis Example 6 was uniformly dry blended in a Henschel mixer, it was fed to a twin-screw kneader extruder (PCM-45, manufactured by Ikegai Corp.) having a barrel diameter of 45 mm and kneaded at a cylinder temperature of 260 to 330° C., thereby obtaining pellets. The pellets thus obtained were dried at 150° C. for 6 hours and then fed to a single-screw extruder having a barrel diameter of 40 mm and equipped with a melt-blow die composed of 300 nozzles each having a nozzle diameter of 0.3 mm to melt-blow them under conditions of a resin temperature (spinning temperature) upon passing through the melt-blow die of 320° C., a discharge rate of 0.1 g/min/nozzle, a gas temperature of 350° C. and an air flow rate of 3 $Nm^3$/min, thereby producing a non-woven fabric. As a result, a melt-blow non-woven PPS fabric having an average fineness of 8.5 μm and a METSUKE of 150 g/$m^2$ and causing no shot was able to be obtained. However, the average fineness was too great, and so the non-woven fabric was unable to be used for a filter.

This non-woven fabric was heat-treated at 150° C. for 5 hours and cut into strips 2 cm wide to conduct a tensile test under conditions of a measuring temperature of 23° C., a gauge length of 50 mm and a cross-head speed of 5 mm/min, thereby determining its tensile strength. As a result, the tensile strength was found to be 1.0 kg/cm.

Example 15

After 98 wt. % of Polymer D obtained in Synthesis Example 4 and 2 wt. % of ε-caprolactam were uniformly dry blended in a Henschel mixer, the resultant blend was fed to a twin-screw kneader extruder (PCM-45, manufactured by Ikegai Corp.) having a barrel diameter of 45 mm and kneaded at a cylinder temperature of 260 to 330° C., thereby obtaining pellets.

The pellets thus obtained were dried at 150° C. for 6 hours and then fed to a single-screw extruder having a barrel diameter of 25 mm and equipped with a nozzle having a nozzle diameter of 2.8 mm to melt-extrude them into a fibrous form at an extrusion temperature of 310° C. After the fibrous extrudate was cooled in hot water of 90° C., it was first-stage stretched 4 times in a wet heat bath controlled at 130° C., second-stage stretched 1.5 times in a wet heat bath controlled at 180° C., and then relaxed 0.98 times for about 6 seconds in a dry heat bath controlled at 240° C., thereby obtaining a PAS fiber having a fiber diameter of about 250 μm. The fiber was stably provided for 30 hours during the production thereof, its fiber diameter scarcely varied, and the yield thereof was at least 98%.

Comparative Example 9

Polymer D obtained in Synthesis Example 4 was fed to a twin-screw kneader extruder (PCM-45, manufactured by Ikegai Corp.) having a barrel diameter of 45 mm and kneaded at a cylinder temperature of 260 to 330° C., thereby obtaining pellets. The pellets thus obtained were dried at 150° C. for 6 hours and then formed into a fiber under the same conditions as in Example 15. The fiber diameter of the resultant fiber widely varied, and the yield thereof was 60%.

Comparative Example 10

Polymer D obtained in Synthesis Example 4 was fed to a twin-screw kneader extruder (PCM-45, manufactured by Ikegai Corp.) having a barrel diameter of 45 mm and kneaded at a cylinder temperature of 260 to 330° C., thereby obtaining pellets. The pellets thus obtained were dried at 150° C. for 6 hours and then fed to the same single-screw extruder as that used in Example 15 to melt-extrude them into a fibrous form at an extrusion temperature of 340° C. After the fibrous extrudate was cooled in hot water of 90° C., it was first-stage stretched 4 times in a wet heat bath controlled at 130° C., second-stage stretched 1.5 times in a wet heat bath controlled at 180° C., and then relaxed 0.98 times for about 6 seconds in a dry heat bath controlled at 240° C., thereby obtaining a PAS fiber having a fiber diameter of about 250 μm. A scatter of fiber diameter became wide after the fiber was continuously produced for 3 hours, and so the fiber was unable to be stably provided over a long period of time.

INDUSTRIAL APPLICABILITY

According to the present invention, there are PAS resin compositions markedly improved in flowability, mechanical properties and crystallization-facilitating effect upon molding. More specifically, the present invention brings about the following advantages:

(1) The PAS resin compositions according to the present invention can be easily molded into molded products of complicated forms due to their improved melt-flow properties. The molded products are excellent in mechanical properties, and so the weight saving of the molded products can be made.

(2) The PAS resin compositions according to the present invention permit reducing the load of an extruder upon extrusion due to their improved melt-flow properties, and can hence be stably subjected to extrusion.

(3) The PAS resin compositions according to the present invention can provide molded products having good surface gloss and high crystallinity even when they are injection-molded at a mold temperature lower than the usual temperature by 20 to 50° C.

(4) When the PAS resin compositions according to the present invention are injection-molded, the molding cycle can be shortened, so that the productivity can be enhanced, and the production cost can be reduced.

(5) The PAS resin compositions according to the present invention are excellent in heat stability, and evaporated gases or decomposed gases, which are attributable to additives, are scarcely generated, and so obstacles due to these gases are scarcely encountered.

(6) The PAS resin compositions according to the present invention can be used to provide non-woven fabrics which are composed of extremely fine fibers, narrow in scatter of fineness and excellent in heat resistance, flame retardancy, chemical resistance, toughness, tensile strength, dimensional stability and the like. The non-woven PAS fabrics according to the present invention are suitable for use as high-performance filters.

(7) The PAS resin compositions according to the present invention can be stably formed into monofilaments narrow in scatter of fiber diameter. The PAS monofilaments according to the present invention are narrow in scatter of fiber diameter and have excellent heat resistance, flame retardancy, chemical resistance, tensile strength, knot strength and the like.

What is claimed is:

1. A process for producing a poly(arylene sulfide) resin composition comprising a step of mixing
    (a) a purified poly(arylene sulfide) obtained by removing a polar solvent, oligomers, unreacted monomers, by-product and impurities after polymerization, and
    (b) at least one organic amide compound, as a modifier, selected from the group consisting of N,N-dimethylformamide, N,N-dimethylacetamide, N-alkylpyrrolidones, N-cycloalkyl-pyrrolidones, N-alkylcaprolactams, N-cycloalkyl-caprolactams, caprolactams, N,N-dialkylimidazolidinones, tetraalkylureas and hexaalkylphosphoric triamides in a proportion of 0.2 to 10 parts by weight per 100 parts by weight of the purified poly(arylene sulfide).

2. The process according to claim 1, wherein the step of mixing further comprising of mixing
    (c) a filler in a proportion of 0 to 800 parts by weight per 100 parts by weight of the poly(arylene sulfide).

3. The process according to claim 1, wherein the organic amide compound is at least one compound selected from the group consisting of N-alkyl-pyrrolidones, N-cycloalkyl-pyrrolidones, N-alkyl-caprolactams, N-cycloalkylcaprolactams, caprolactams and N,N-dialkylimidazolidinones.

4. The process according to claim 1, wherein the N-alkyl-pyrrolidone is N-methyl-2-pyrrolidone.

5. The process according to claim 1, wherein the caprolactam is ε-caprolactam.

6. The process according to claim 1, wherein the N,N-dialkylimidazolidinone is 1,3-dimethyl-2-imidazolidinone.

7. The process according to claim 1, wherein the poly (arylene sulfide) is poly(phenylene sulfide).

* * * * *